US006685154B1

(12) United States Patent
Blyth et al.

(10) Patent No.: US 6,685,154 B1
(45) Date of Patent: Feb. 3, 2004

(54) CONNECTOR AND METHOD FOR ASSEMBLING STRUCTURAL ELEMENTS TOGETHER WITHOUT THE USE OF WELDMENTS

(76) Inventors: Robert Blyth, 3095 Arthur Hoole #6, St. Hubert, Quebec (CA), J3Y 8X2; Philip V. DeSantis, 6449 Bayberry Dr., Seven Hills, OH (US) 44131; David A. Hubbell, P.O. Box 600, Saranac Lake, NY (US) 12983

( * ) Notice: Subject to any disclaimer, the term of this patent is extended or adjusted under 35 U.S.C. 154(b) by 0 days.

(21) Appl. No.: 09/627,454

(22) Filed: Jul. 27, 2000

(51) Int. Cl.[7] .......... F16M 13/00
(52) U.S. Cl. .......... 248/512; 248/219.1
(58) Field of Search .......... 248/512, 535, 248/536, 219.1, 214, 219.3; 285/39, 150, 348, 351, 356; 403/172, 217, 292, 298, 295

(56) References Cited

U.S. PATENT DOCUMENTS

| | | | | | |
|---|---|---|---|---|---|
| 302,343 | A | * | 7/1884 | Kitton | 285/321 |
| 1,261,213 | A | * | 4/1918 | Clay | 285/321 |
| 1,308,630 | A | * | 7/1919 | Hatch | 285/321 |
| 2,066,419 | A | | 1/1937 | Pfistershammer | 189/26 |
| 3,270,480 | A | | 9/1966 | Beecker | 52/726 |
| 3,369,331 | A | | 2/1968 | Deskey et al. | 52/38 |
| 3,410,995 | A | | 11/1968 | Gray | 240/84 |
| 3,508,731 | A | | 4/1970 | Jablonski | 248/221 |
| 3,586,280 | A | * | 6/1971 | Parduhn | 248/214 |
| 3,624,269 | A | | 11/1971 | Latta | 174/45 R |
| 3,638,891 | A | | 2/1972 | Schlosser | 248/221 |
| 3,755,977 | A | | 9/1973 | Lewis | 52/98 |
| 3,917,205 | A | * | 11/1975 | Meadors | 248/229 |
| 4,138,953 | A | * | 2/1979 | Tashman | 108/144 |
| 4,639,843 | A | | 1/1987 | Compton | 362/431 |
| 4,787,019 | A | | 11/1988 | van den Broeke | 362/250 |
| 4,792,160 | A | * | 12/1988 | Hwang | 285/39 |
| 4,813,199 | A | | 3/1989 | Lewis, Jr. | 52/98 |
| 4,878,160 | A | | 10/1989 | Reneau et al. | 362/269 |
| 4,908,018 | A | * | 3/1990 | Thomsen | 604/83 |
| 4,930,816 | A | * | 6/1990 | Billing-Yih | 285/321 |
| 5,149,188 | A | | 9/1992 | Robbins | 362/183 |
| 5,266,738 | A | | 11/1993 | MacVoy | 174/45 R |
| 5,554,088 | A | * | 9/1996 | Zlojutro | 482/83 |
| 5,564,711 | A | * | 10/1996 | Scheie | 273/400 |
| 5,601,274 | A | | 2/1997 | Minor et al. | 248/594 |
| 5,692,720 | A | * | 12/1997 | Griggs | 248/530 |
| 5,772,172 | A | | 6/1998 | Sampedro et al. | 248/415 |
| 6,142,453 | A | * | 11/2000 | Martin | 256/65 |
| 6,149,112 | A | * | 11/2000 | Thieltges | 248/178.1 |
| 6,161,876 | A | * | 12/2000 | Sabathie | 285/39 |

* cited by examiner

*Primary Examiner*—Ramon O. Ramirez
*Assistant Examiner*—A. Joseph Wujciak
(74) *Attorney, Agent, or Firm*—Shlesinger, Arkwright & Garvey LLP

(57) ABSTRACT

A structural connector for connecting a horizontal member to a vertical member comprises an integral body from a single casting having a vertically oriented first sleeve portion and a horizontally oriented second sleeve portion. The first sleeve portion is integral with the second sleeve portion. The first sleeve portion has a tapered bore adapted to be slip fit around a tapered outside surface of the vertical member. The second sleeve has an outside diameter adapted to be slip fit within an interior bore of the horizontal member.

19 Claims, 3 Drawing Sheets

FIG. 2
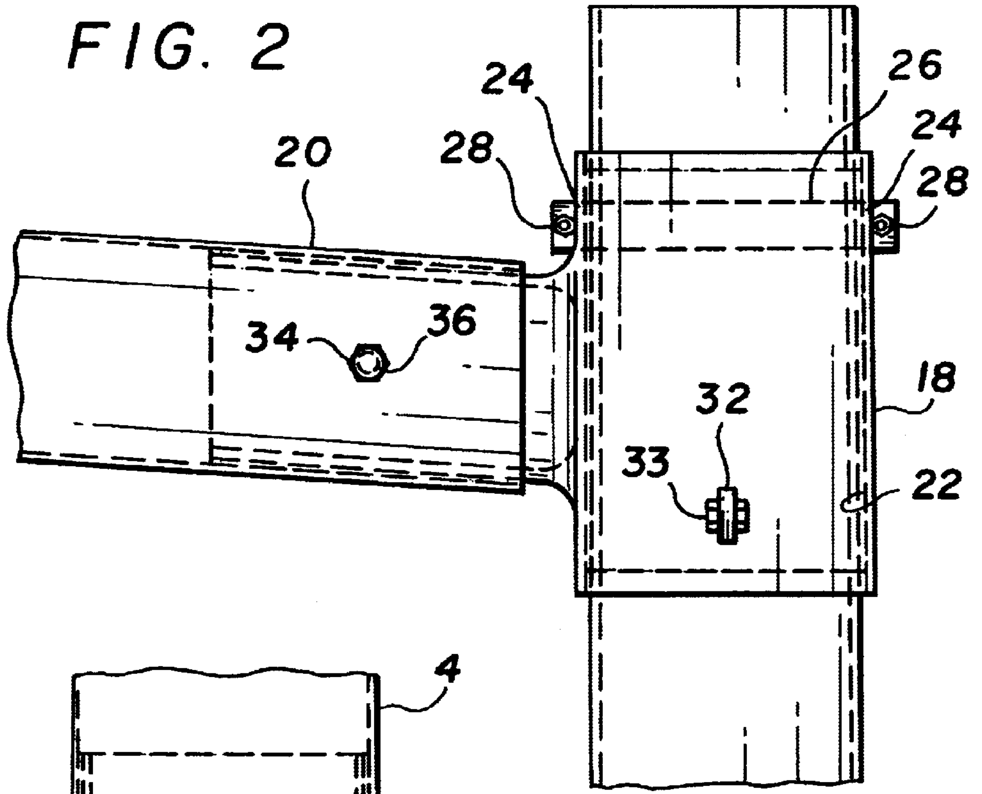
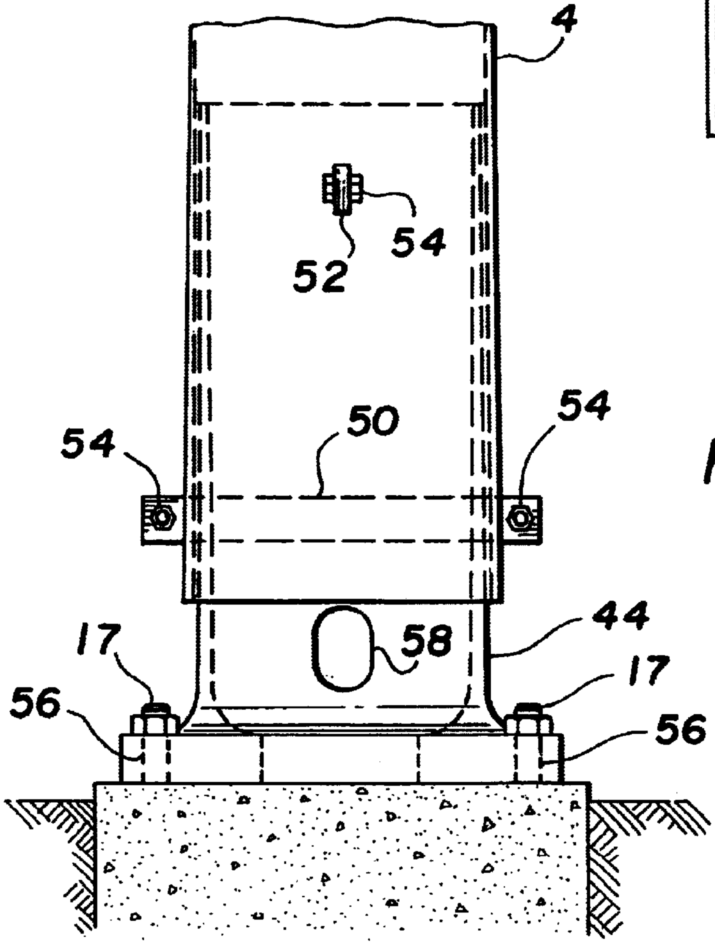
FIG. 4

FIG. 3
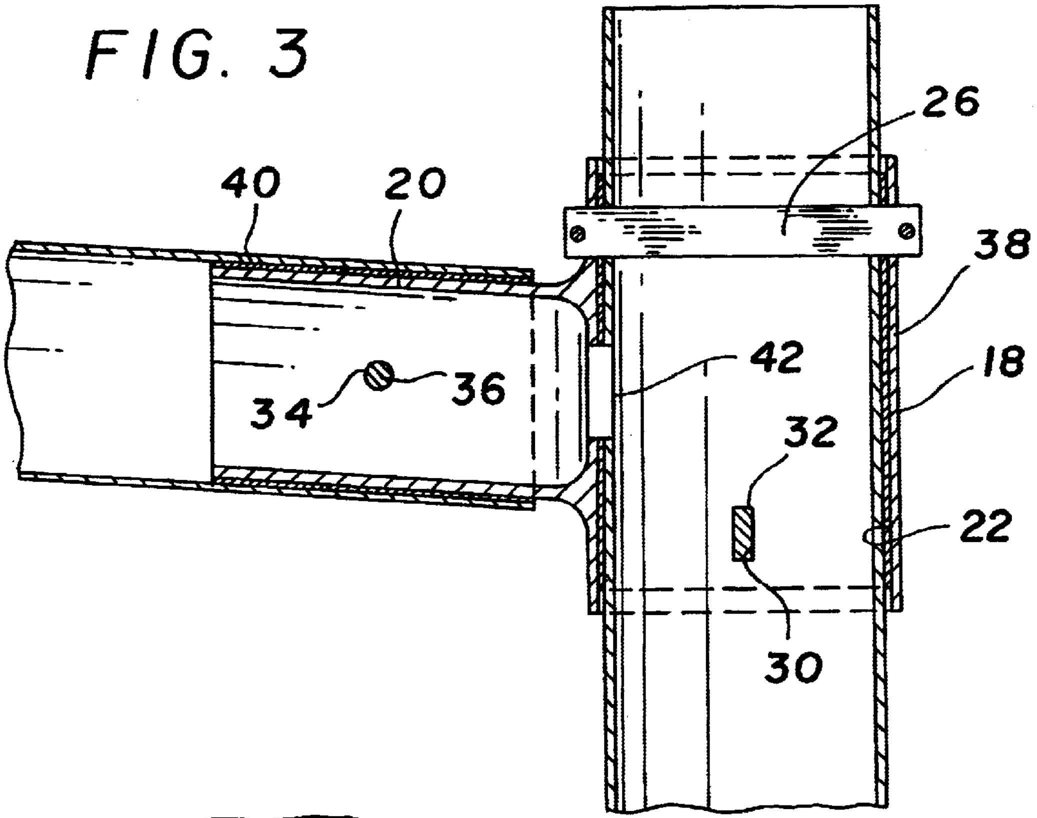
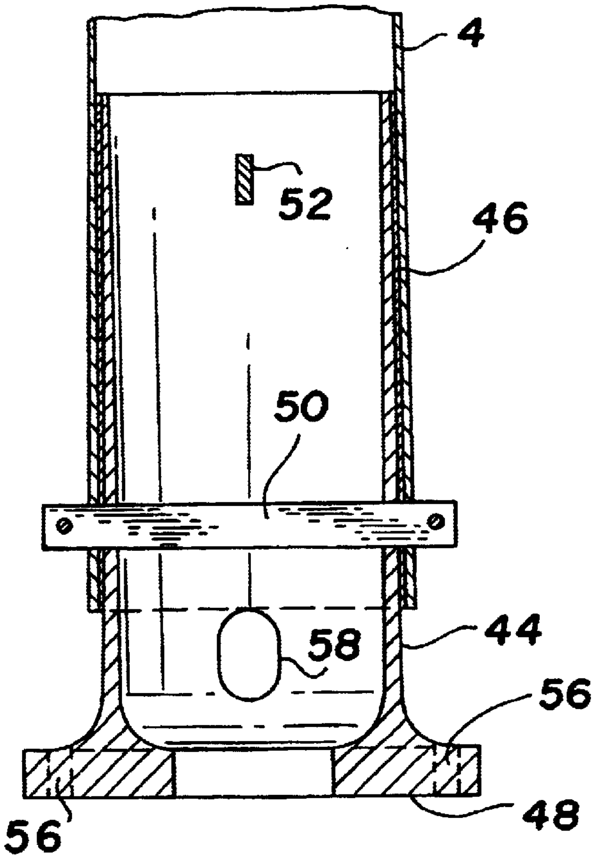
FIG. 5

CONNECTOR AND METHOD FOR ASSEMBLING STRUCTURAL ELEMENTS TOGETHER WITHOUT THE USE OF WELDMENTS

FIELD OF THE INVENTION

The present invention relates generally to a connector for structurally joining two or more structural elements, and particularly to a connector from a single casting that eliminates the use of weldments, which may or may not be subjected to fatigue-type loadings.

BACKGROUND OF THE INVENTION

The prior art for providing the transfer of moment forces between a horizontally mounted tubular arm and a vertical tubular pole is through the use of weldments. Traditionally, simple mast-and-arm, post-and-arm, cantilevered service poles, traffic light poles and other similarly designed structures have used tubular members and attached the members by means of welded flange plates and/or welded splice plates and/or connection plates. These jointed structures are usually designed so as to be intentionally stronger than the individually attached structural members. They are designed to carry dead load and moment forces, and load shears and torsion loads (due, for example, to wind loading) about the vertical axis of the pole.

Weldments are subject to fatigue stresses. Recent structural failures and the resulting research has identified weldment fatigue failure as the primary cause of these structural failures. One result from the findings is a rewrite of the AASHTO (American Association of State Highway and Transportation Officials) Design Code involving a shift in critical design load consideration from base-metal requirements to that of weldment placement and quantity. The areas that are fatigue stress critical are the toe of the weld connecting the arm tube to the arm plate, the gusset plate weld between the pole plate and the pole tube, and the base plate weld to the vertical tube.

The present invention provides means and methods for joining two or more structural members without the use of weldments. The present invention provides a structural member without suffering the fatigue-load weakness of the prior art joint designs while still able to transfer intended design loads.

OBJECTS AND SUMMARY OF THE INVENTION

It is an object of the present invention to provide a connector to connect one structural member to another without the use of weldments.

It is another object of the present invention to provide a connector made from a single piece casting to connect one structural member to another without the use of weldments.

In summary, the present invention provides a structural connector for connecting a horizontal member to a vertical member, comprising an integral body from a single casting having a vertically oriented first sleeve portion and a horizontally oriented second sleeve portion. The first sleeve portion is integral with the second sleeve portion. The first sleeve portion has a tapered bore adapted to be slip fit around a tapered outside surface of the vertical member. The second sleeve has an outside diameter adapted to be slip fit within an interior bore of the horizontal member.

The present invention also provides a structural connector for securing the vertical member to a fixed base, comprising an integral body from a single casting. The body includes a vertically oriented sleeve portion and a flange portion oriented transversely to the sleeve portion. The sleeve portion and the flange portion are integral to one another. The sleeve portion includes an outside tapered surface adapted to slip fit inside a tapered bore of the vertical member.

These and other objects of the present invention will become apparent from the following detailed description.

BRIEF DESCRIPTIONS OF THE DRAWINGS

FIG. 2 is an enlarged side elevational view of a connection between the pole and arm shown in FIG. 1.

FIG. 3 is a cross-sectional view of FIG. 2.

FIG. 4 is an enlarged side elevational view of a connection between the pole and the foundation shown in FIG. 1.

FIG. 5 is a cross-sectional view of FIG. 4.

DETAILED DESCRIPTION OF THE INVENTION

Figure 1:
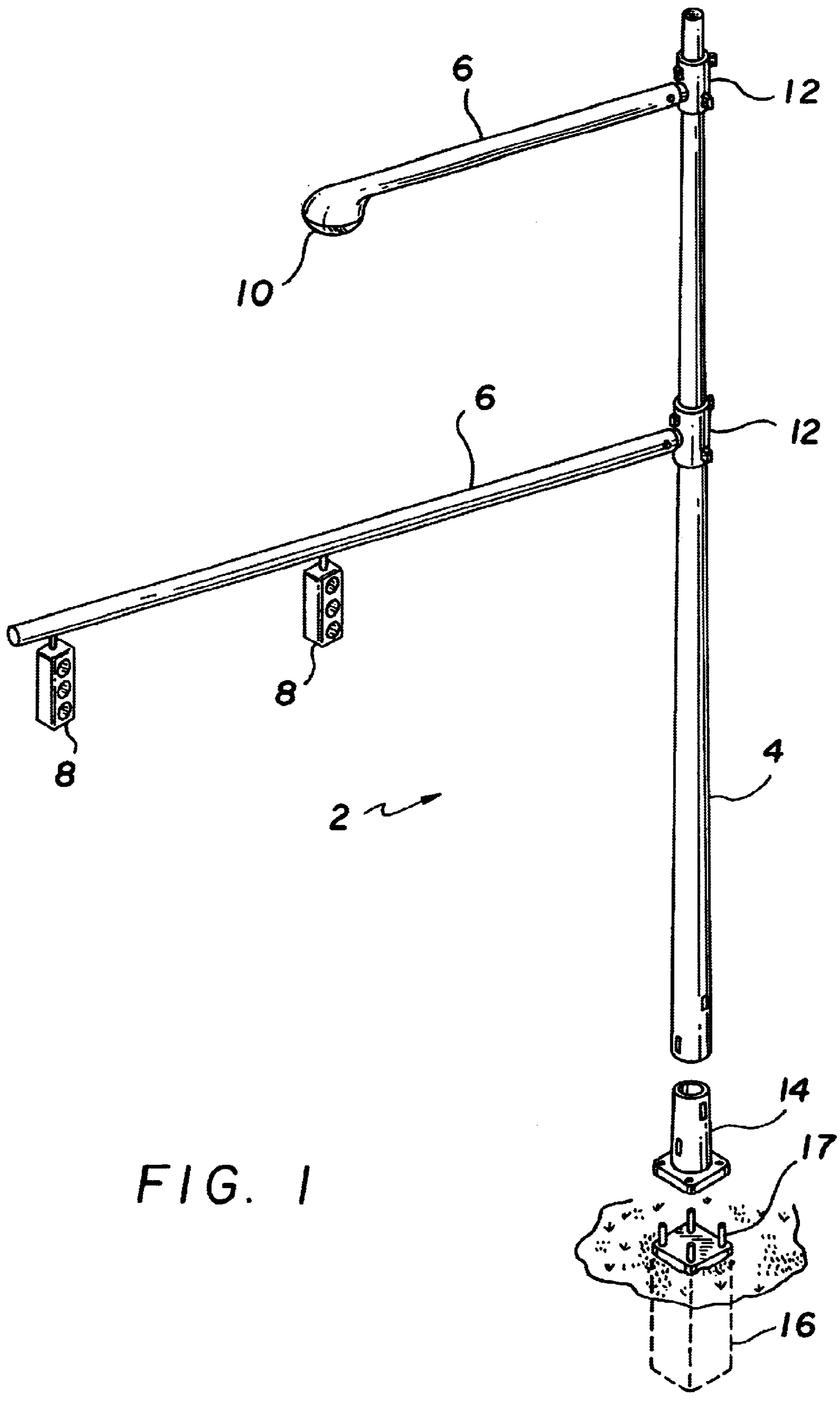
FIG. 1 is a perspective view, with portions shown in exploded view, of a street/traffic light support structure using the present invention.

The present invention will be described using as an example a traffic light/street light support structure. However, it should be understood that it is also applicable to many other applications where a connection between two structural members is required, such as pole and arm assemblies, utility pole cross arm and base connections, high mast lighting base connections, etc.

Referring to FIG. 1, a traffic light/street light support structure 2 is disclosed. The structure 2 includes a pole 4 and a pair of arms 6, respectively supporting a pair of traffic light fixtures 8 and a street lamp 10. A pair of single piece castings 12 connect the respective arm 6 to the pole 4. A single piece casting 14 connects the base of the pole to a foundation 16 by means of bolts 17. The pole 4 and the arms 6 are typically tubular.

Referring to FIGS. 2 and 3, the casting 12 is an integral body including a vertically oriented sleeve portion 18 and horizontally oriented sleeve portion 20. The sleeve portion 18 has a tapered bore or, opening 22 substantially similar to the taper of the pole 4 for a slip fit. The opening 22 is disclosed as having a circular cross-section to match the circular cross-section of the outer surface of the pole; however, it should be understood that the opening 22 may have a different cross-sectional shape to conform to the outer cross-sectional shape of the pole. The sleeve portion 18 includes a pair of openings 24 aligned through the diameter of the pole. The openings 24 are also aligned with respective pair of openings through the wall of the pole so that a shear bar 26 may be positioned through the openings with its opposite ends extending beyond the wall of the sleeve portion. A bolt 28 or other standard means is disposed at each end of the bar 26 to prevent bar from being inadvertently removed.

Another pair of openings 30 on opposite wall portions of the sleeve portion 18 and aligned through the diameter of the pole and oriented at right angles to the openings 24 are provided at a lower end portion of the sleeve portion 18. A shear bar 32 is disposed through the openings 30 and through corresponding openings in the pole. Bolts 33 or other standard means are provided at respective end of the shear bar 32 to prevent it from being inadvertently removed.

The sleeve portion 20 has an outer diameter adapted to be slip fit inside an end portion of the arm 6. The outer surface of the sleeve portion 20 is disclosed as having a circular cross-section to match the cross-sectional shape of the inner surface or opening at the attachment end of the arm; however, it should be understood that the outer surface of the sleeve portion 20 may have a different cross-sectional shape so as to conform to the cross-sectional shape of the inner opening at the end of the arm. A pair of openings 34 aligned through the diameter or width of the arm 6 are disposed at opposite wall portions of the sleeve portion 20. A bolt 36 or a round bar is disposed through the openings 34 and through the corresponding openings in the arm. A nut (not shown) secures the bolt 36 to prevent it from being inadvertently removed. The bolt 36 will prevent the arm tube 6 from being dragged off the casting if it were impacted by outside forces, such as when hit by a vehicle. The bolt 36 is only intended to carry torsion loading, and not any other forms of loading.

Structural pads 38 and 40 are respectively disposed between the pole and sleeve portion 18, and the arm and the sleeve portion 20. The pads 38 and 40 are attached to the sleeve portions 18 and 20, respectively, with adhesive or other standard means. The pads advantageously distribute the bearing loads available at the respective location over wider areas than metal-to-metal contact. However, in some cases where there is a close fit between the casting and the structural member being joined, the use of the pads may be dispensed with. The pads also provide some level of dampening in the system. The pads act as insulators between the casting and the pole and the arm in case the casting is made from a material different from the pole or arm material. The pads have relatively high compressive strength to withstand the expected loads available at the point of use without collapsing. Structural pads have been used as vibration isolators in the installation of heavy machinery in buildings and in the base support for lighting poles.

The sleeve portion 18 is slipped over the pole to the desired location for a slip fit. The slip fit between the casting and the pole will transfer the bending moment from the dead load imposed by the arm 6. The pad 38 will take up any slack or gap between the sleeve portion 18 and the pole and distribute the bearing loads over a wider areas. The shear bars 26 and 32, preferably disposed at right angles to each other, are designed to carry the wind moment applied to the arm by wind gusts. The openings 24 and 30 and the corresponding openings in the pole are slightly oversized for the shear bars to allow a certain amount of flexing of the pad 38 to help dissipate the energy of the wind gusts. The arm would displace the casting and rotate it relative to the pole tube. This rotation is controlled by the amount of gap around the shear bars. A gap of 0.1 inches would be typical.

The slip fit between the casting and the pole transfers the bending moment from the arm tube to the pole tube. A tight fit is not required. Under current industry practice, as much as 0.2 inch gap is acceptable. The length of the sleeve portions 18 and 20 measured along the pole axis is preferably 1.5 times the diameter of the pole for effective transfer of the bending moment.

The casting 12 and the structural elements to be attached have mating contact surfaces, but differences can be accommodated using varying thicknesses of structural pads. If space between the outside surface of the pole and the inside of the casting is too large to be filled by the structural pad, a tube liner may be placed around the pole inside the casting. The tube liner is a thickness of metal bent to conform to the outside surface of the pole. It is preferably made of the same material as the pole to prevent problems caused by contact between dissimilar metals.

An opening 42 within the casting 2 is provided for routing electrical wiring from the pole to the arm. A corresponding hole in the pole is provided.

It will be understood that the casting 12 removes the need for welding the arm connection to the pole tube. It also eliminates the weld between the arm and the plate used to bolt the arm to the pole plate.

It should be understood that the casting may be modified to include two sleeve portions 20 disposed 90° to each other to permit two arms to be carried by the same pole for traffic signals.

Referring to FIGS. 4 and 5, a base plate casting 44 is disclosed. The casting 44 is used to transfer the load from the pole to the anchor bolts 17. The casting 44 includes a vertical sleeve portion 46 and a flange portion 48. The sleeve portion 46 has a tapered outside surface that slip fits inside the bottom portion of the pole 4, which has the same tapered inner surface. The tapered outside surface is disclosed as being circular in cross-section, although other shapes may be used so as to conform the shape to the inner cross-sectional shape of the pole at the attachment end. Shear bars 50 and 52 preferably disposed at right angles to each other are received into respective openings in the casting 44 and the pole 4. Bolts 54 disposed at each end of the bars prevent the bars from being withdrawn inadvertently. The casting 44 is secured to the foundation with bolts received through holes 56. A handhole 58 is provided to eliminate the provision of a handhole in the pole, which is typically reinforced using a welded ring. The handhole 58 allows the electrical connection to be made in the field after the pole has been erected.

In the prior art, the pole 4 is typically connected to the ground by means of a base plate welded to the bottom of the tube. Anchor bolts are then used to secure the base plate to the foundation. The welding is typically subject to vibrational loadings and has relatively low allowable stress. With the use of the casting 44, welding is advantageously eliminated. In addition, the pole is made stronger because the handhole is eliminated.

The castings 12 and 44 may be made from aluminum, plastic, steel, fiber glass and/or other materials of similar properties used in the construction of structurally seamless element.

As can be seen from the foregoing description, the present invention is a single piece casting or other seamless construct, and manufactured from materials that exhibit a high resistance to fatigue, generally relates to and addresses concerns inherent to means and methods of designing, manufacturing, and assembling individual structural elements and providing an energy dissipating system addressing the issue of fatigue loads. The present invention consists of castings or other constructs of simple design intended to act as joint connector between two or more structural elements such as but not limited to particular tubular tapering structural posts and support arms. A specific application as described above is for the transfer of forces and moments between a horizontally mounted tubular arm and a vertical tubular pole. Another specific application is for the transfer of forces and moments from a vertical tubular pole through a base-plate-and-handhole-assembly to anchor-foundation attachments such as, but not limited to, anchor-bolts. The handhole is a part of the casting and, therefore, needs no welding with any handhole reinforcement or thickening at or near the edge of the handhole proper being part of the casting.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A structural connector for connecting a horizontal member to a vertical member, comprising:

a) an integral structural single piece body;

b) said body including a vertically oriented first sleeve portion and a horizontally oriented second sleeve portion, said first sleeve portion is integral with said second sleeve portion;

c) said first sleeve portion having a tapered bore adapted to be slip fit around a tapered outside surface of the vertical member;

d) said second sleeve portion having an outside diameter adapted to be slip fit within an interior bore of the horizontal member; and e) said first sleeve including opposite wall portions, each having an opening aligned with a respective opening on the opposite wall portion.

2. A structural connector as in claim 1, wherein said first sleeve has an internal wall surface which is circular in cross-section.

3. A structural connector as in claim 1, wherein said second sleeve portion has an outside wall surface which is circular in cross-section.

4. A structural connector as in claim 1, wherein said body is made from a single piece casting.

5. A structural connector for securing a pole to a base, comprising:

a) an integral structural single piece body;

b) said body including a vertically oriented sleeve portion and a flange portion oriented transversely to said sleeve portion, said sleeve portion and said flange portion being integral to one another;

c) said sleeve portion including an outside tapered surface adapted to slip fit inside a tapered bore of a tubular pole; and d) said sleeve portion including opposite wall portions, each including an opening aligned with a respective opening on the opposite wall portion.

6. A structural connector as in claim 5, wherein said flange portion includes openings for receiving anchor bolts for securing to a base foundation.

7. A structural connector as in claim 5, wherein said outside tapered surface is circular in cross-section.

8. A structural connector as in claim 5, wherein said body is made from a single piece casting.

9. A pole assembly, comprising:

a) a vertical pole having a tapered outside surface;

b) a horizontal arm secured to said pole;

c) a first integral body having a vertically oriented first sleeve portion and a second sleeve portion transversely oriented to said first sleeve portion, said first sleeve portion is integral with said second sleeve portion;

d) said first sleeve portion having a tapered bore adapted to be slip fit around said tapered outside surface of said pole;

e) said second sleeve portion having an outside diameter adapted to be slip fit within an interior bore of said arm;

f) whereby said arm is secured to said pole without weldments.

10. A pole assembly as in claim 9, and further comprising:

a) a second integral body including a vertically oriented third sleeve portion and a flange portion oriented transversely to said third sleeve portion, said third sleeve portion and said flange portion being integral to one another; and b) said third sleeve portion including an outside tapered surface adapted to slip fit inside a tapered bore of a tubular pole, said flange portion including openings for receiving anchor bolts for securing to a base foundation.

11. A pole assembly as in claim 10, and further comprising a structural pad disposed between said outside tapered surface and said pole.

12. A pole assembly as in claim 9, wherein said first sleeve includes opposite wall portions each having an opening aligned with a respective opening on the opposite wall portion.

13. A pole assembly as in claim 9, wherein said second sleeve includes opposite walls having a pair of aligned openings.

14. A pole assembly as in claim 9, and further comprising a structural pad disposed between an inner surface of said first sleeve and said pole.

15. A pole assembly as in claim 9, and further comprising a structural pad disposed between an inner surface of said second sleeve and said pole.

16. A pole assembly as in claim 9, wherein said body is made from a single piece casting.

17. A pole assembly as in claim 9, and further comprising a tube liner disposed between an inner surface of said first sleeve and said pole.

18. A pole assembly as in claim 9, and further comprising a tube liner disposed between an inner surface of said second sleeve and said pole.

19. A structural connector for connecting a horizontal member to a vertical member, comprising:

a) an integral structural single piece body;

b) said body including a vertically oriented first sleeve portion and a horizontally oriented second sleeve portion, said first sleeve portion is integral with said second sleeve portion;

c) said first sleeve portion having a tapered bore adapted to be slip fit around a tapered outside surface of the vertical member;

d) said second sleeve portion having an outside diameter adapted to be slip fit within an interior bore of the horizontal member; and e) said second sleeve including opposite walls having a pair of aligned openings.

* * * * *